United States Patent
Lee et al.

(10) Patent No.: US 10,632,403 B2
(45) Date of Patent: *Apr. 28, 2020

(54) MULTICAGE-TYPE APPARATUS FOR FILTERING BALLAST WATER FOR AUTOMATICALLY CONTROLLING SIMULTANEOUS REVERSE CLEANING AND METHOD FOR SAME

(75) Inventors: Soo-Tae Lee, Busan (TW); Tae-Sung Pyo, Busan (TW); Su-Kyu Lee, Busan (TW)

(73) Assignee: Panasia Co., LTD, Busan (KR)

( * ) Notice: Subject to any disclaimer, the term of this patent is extended or adjusted under 35 U.S.C. 154(b) by 784 days.

This patent is subject to a terminal disclaimer.

(21) Appl. No.: 14/421,201

(22) PCT Filed: Sep. 6, 2012

(86) PCT No.: PCT/KR2012/007171
§ 371 (c)(1),
(2), (4) Date: Nov. 9, 2015

(87) PCT Pub. No.: WO2014/027715
PCT Pub. Date: Feb. 20, 2014

(65) Prior Publication Data
US 2016/0067636 A1 Mar. 10, 2016

(30) Foreign Application Priority Data
Aug. 17, 2012 (KR) .......................... 10-2012-0089933

(51) Int. Cl.
 *B01D 29/68* (2006.01)
 *B63J 4/00* (2006.01)
 (Continued)

(52) U.S. Cl.
 CPC .......... *B01D 29/688* (2013.01); *B01D 29/117* (2013.01); *B01D 29/52* (2013.01);
 (Continued)

(58) Field of Classification Search
 CPC ...... B01D 29/60; B01D 29/62; B01D 35/143; C02F 1/32
 (Continued)

(56) References Cited

U.S. PATENT DOCUMENTS

| | | | | |
|---|---|---|---|---|
| 2,835,390 | A | * 5/1958 | King | B01D 29/25 210/411 |
| 2002/0036177 | A1 | * 3/2002 | Ellard | B01D 24/002 210/798 |

(Continued)

FOREIGN PATENT DOCUMENTS

| | | |
|---|---|---|
| JP | 2004-230298 A | 8/2004 |
| KR | 10-0138580 B1 | 4/1998 |

(Continued)

OTHER PUBLICATIONS

WO 2010062032 A2, Jun. 2010, Lee et al.*

*Primary Examiner* — Robert Clemente
*Assistant Examiner* — Akash K Varma
(74) *Attorney, Agent, or Firm* — Workman Nydegger

(57) ABSTRACT

The present invention relates to an a multi-cage type ballast water filtering apparatus having a function of automatically controlling simultaneous backwashing, and a method of automatically controlling the simultaneous backwashing. The apparatus includes a body, and filtering units connected to each other to form a packaged structure in the body. Each filtering unit includes a filter filtering ballast water, and an automatic washing unit backwashing the filter. The apparatus further includes a first pressure sensor measuring the pressure in space between the body and the filters, and a second pressure sensor installed on each of some of the filtering units to measure the pressure in the filter of the corresponding filtering unit. When a difference between pressures measured by the first and second pressure sensors (Continued)

exceeds a predetermined range, the automatic washing units of all of the filtering units are simultaneously operated.

13 Claims, 11 Drawing Sheets

(51) Int. Cl.
    *C02F 1/00* (2006.01)
    *B01D 29/52* (2006.01)
    *B01D 29/60* (2006.01)
    *B01D 29/11* (2006.01)
    *C02F 103/00* (2006.01)

(52) U.S. Cl.
    CPC ......... *B01D 29/606* (2013.01); *B01D 29/682* (2013.01); *B63J 4/002* (2013.01); *C02F 1/004* (2013.01); *C02F 1/008* (2013.01); *B01D 2201/0453* (2013.01); *B01D 2201/082* (2013.01); *C02F 2103/008* (2013.01); *C02F 2209/03* (2013.01); *C02F 2303/16* (2013.01)

(58) Field of Classification Search
    USPC .............................. 210/90, 251, 85, 741, 108
    See application file for complete search history.

(56) References Cited

U.S. PATENT DOCUMENTS

| | | | |
|---|---|---|---|
| 2010/0116647 A1* | 5/2010 | Kornmuller | B63J 4/004 204/228.1 |
| 2011/0226681 A1* | 9/2011 | Lee | C02F 1/325 210/90 |

FOREIGN PATENT DOCUMENTS

| | | | |
|---|---|---|---|
| KR | 10-2009-0067624 A | 6/2009 | |
| WO | WO 2010062032 A2 * | 6/2010 | ............ C02F 1/325 |

* cited by examiner

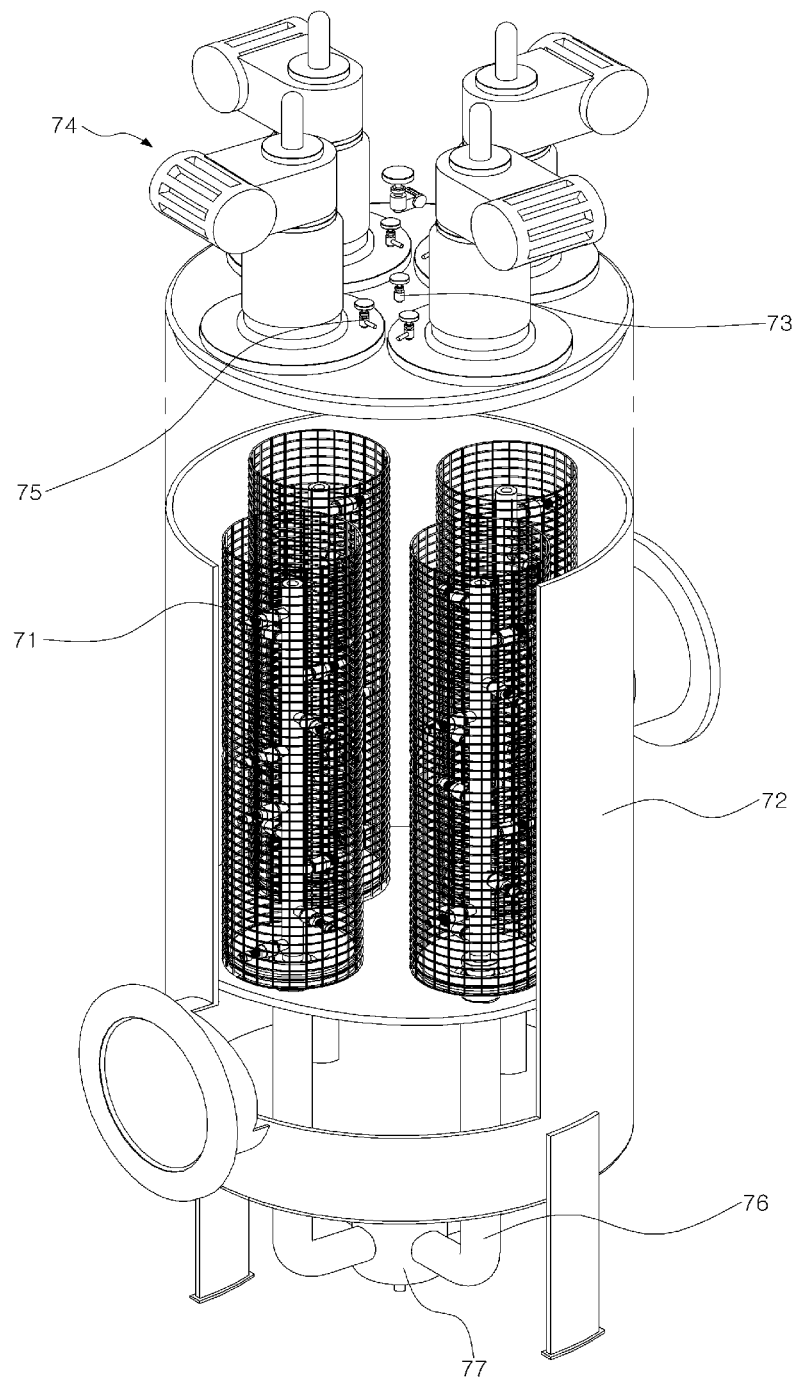
【FIG. 1】

[FIG. 2]
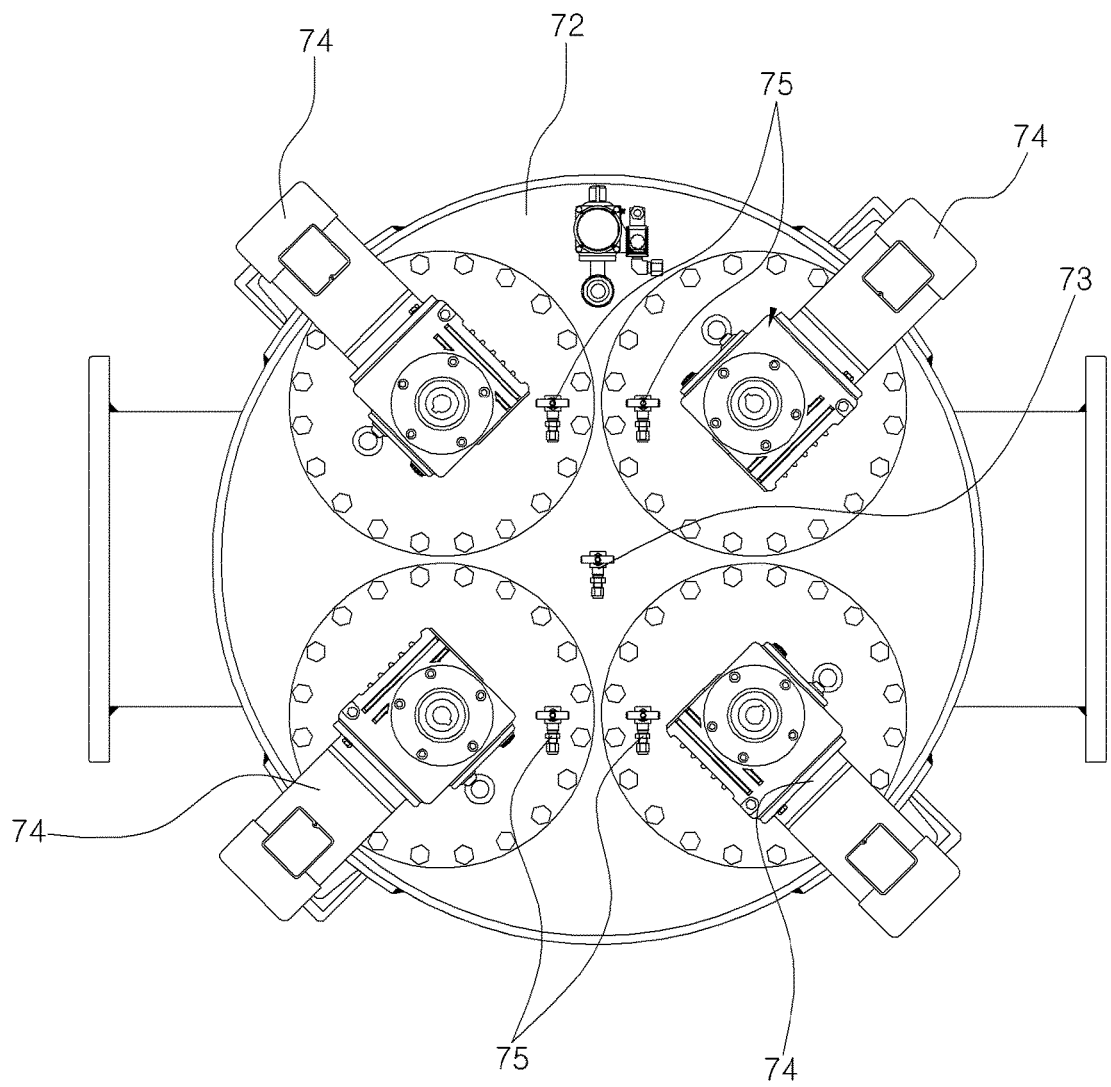

[FIG. 3]
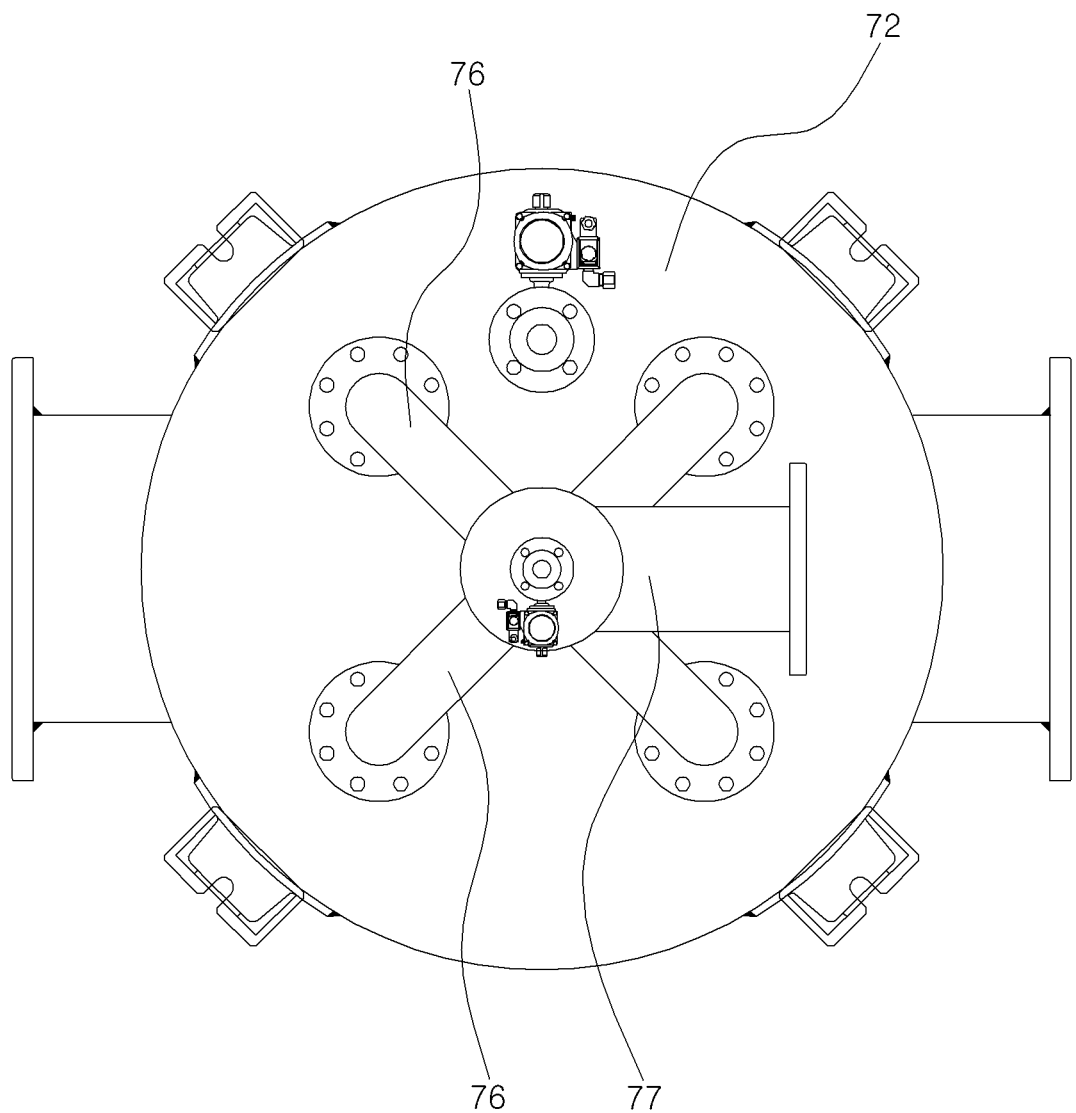

[FIG. 4]
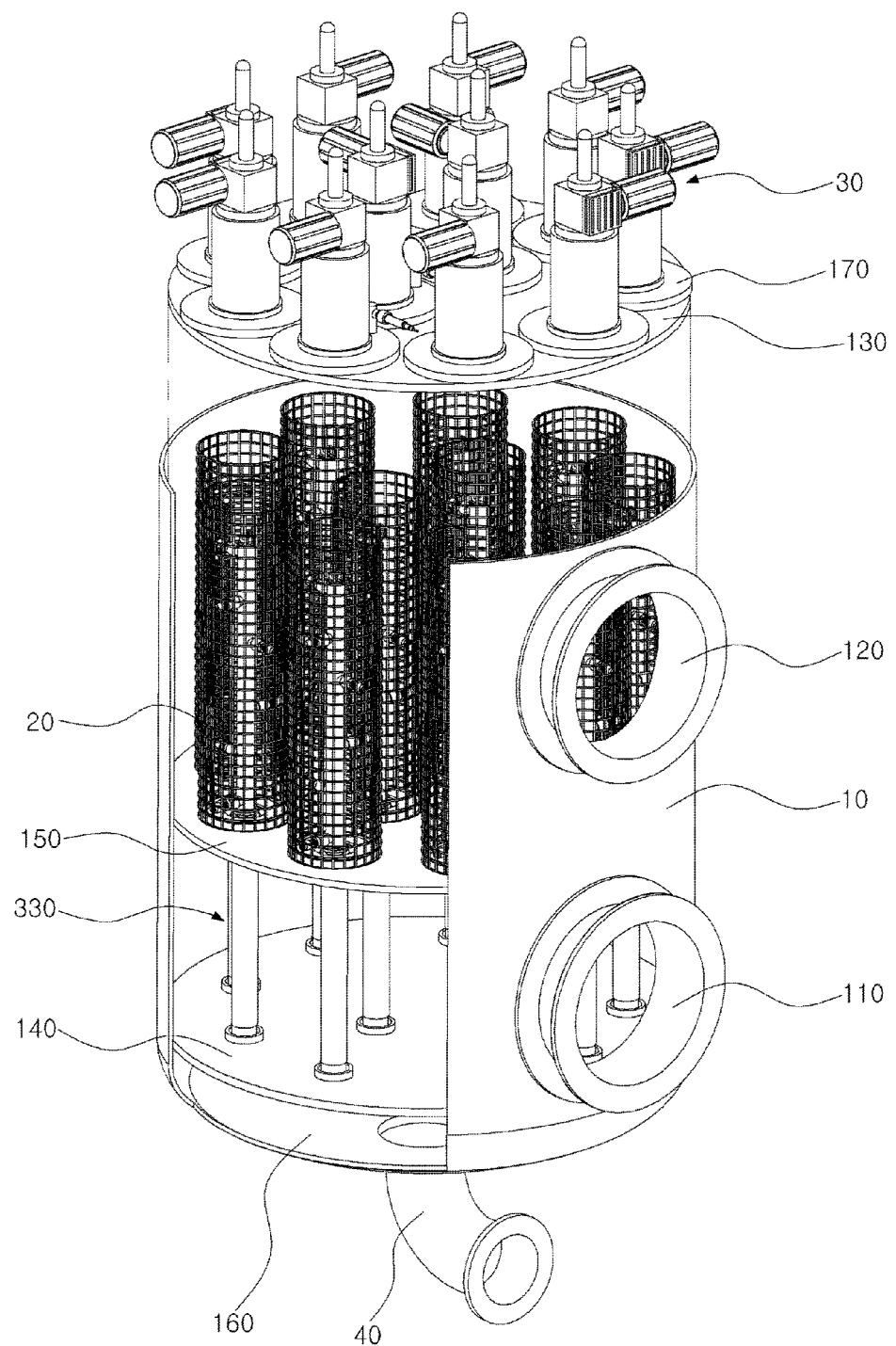

[FIG. 5]
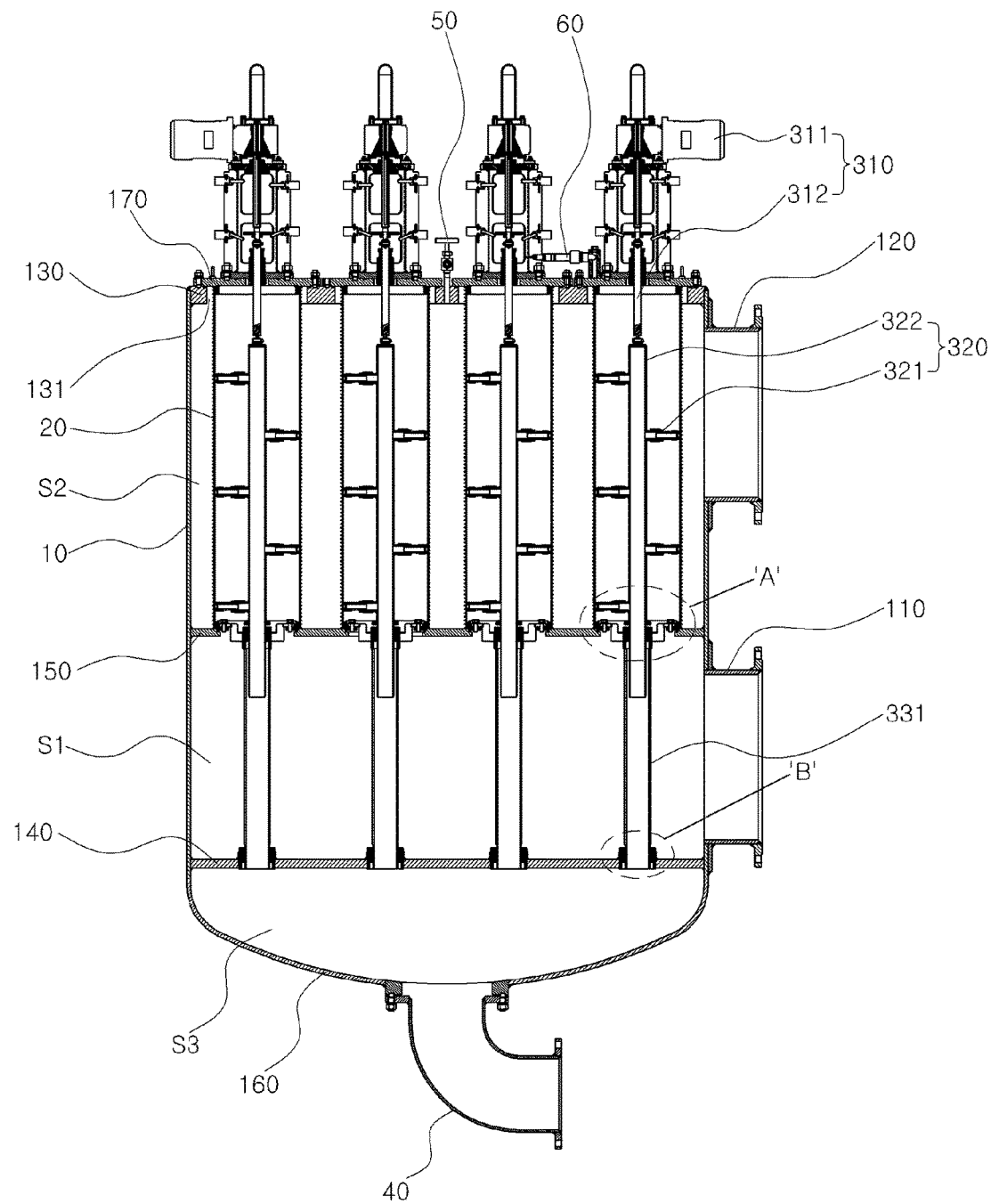

[FIG. 6]
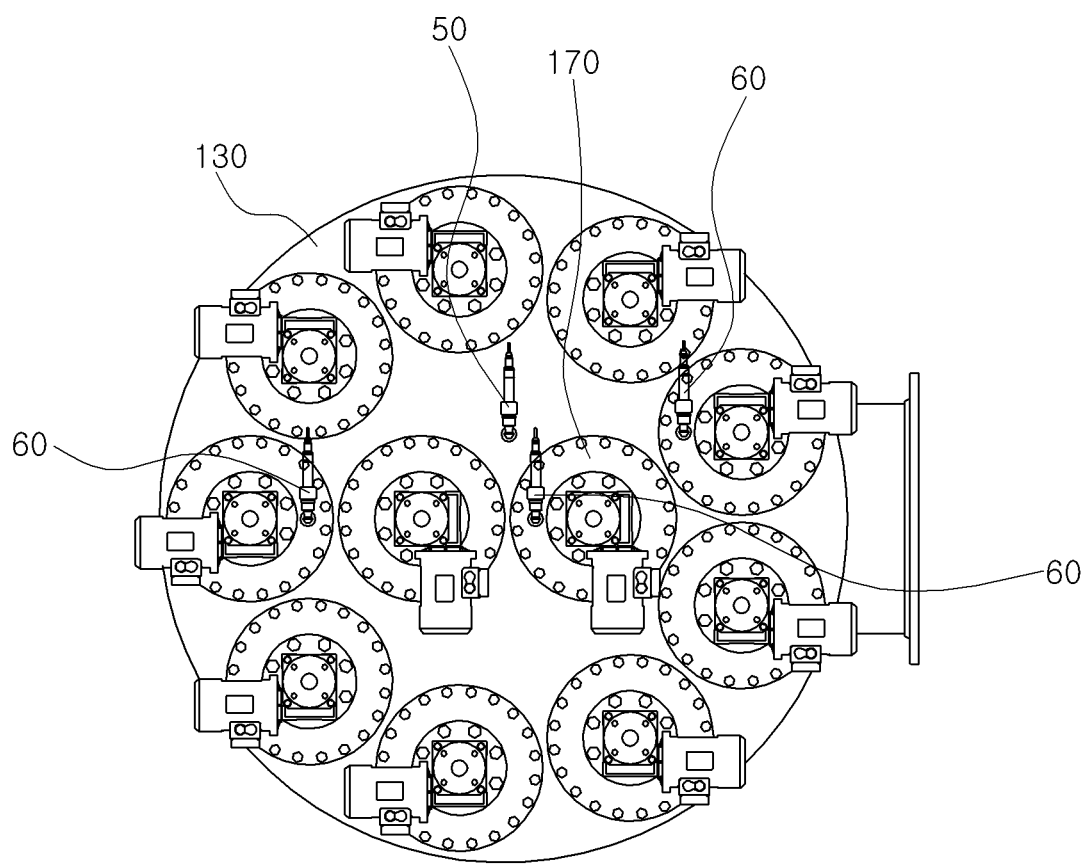

[FIG. 7]
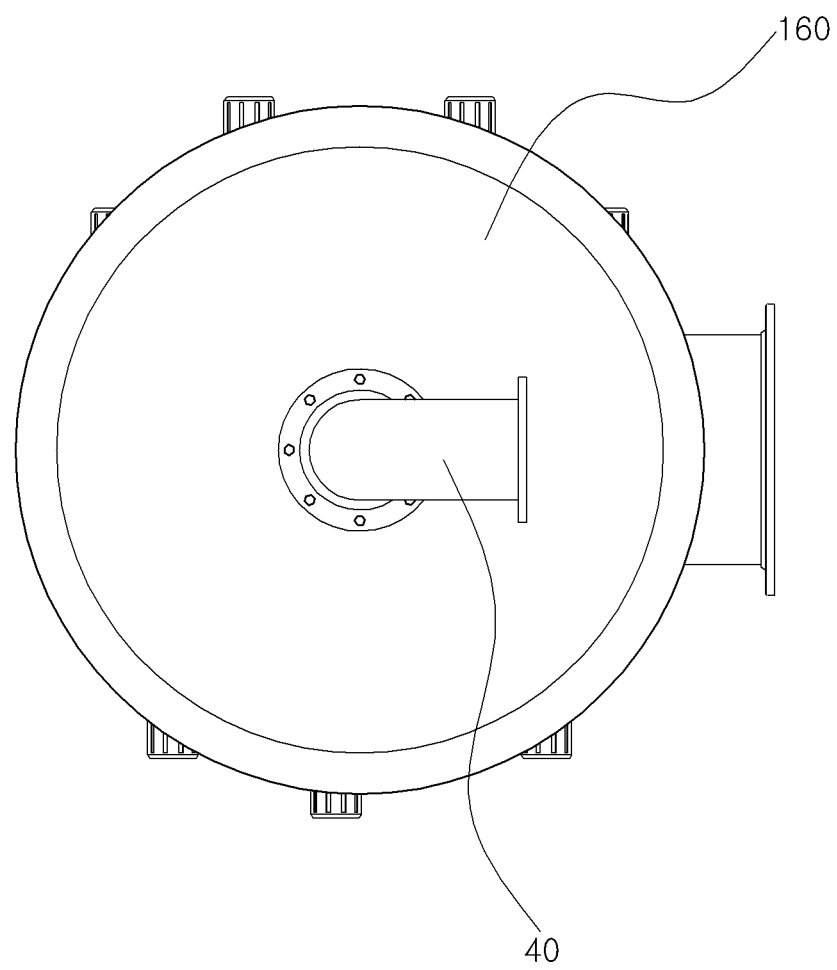

[FIG. 8]
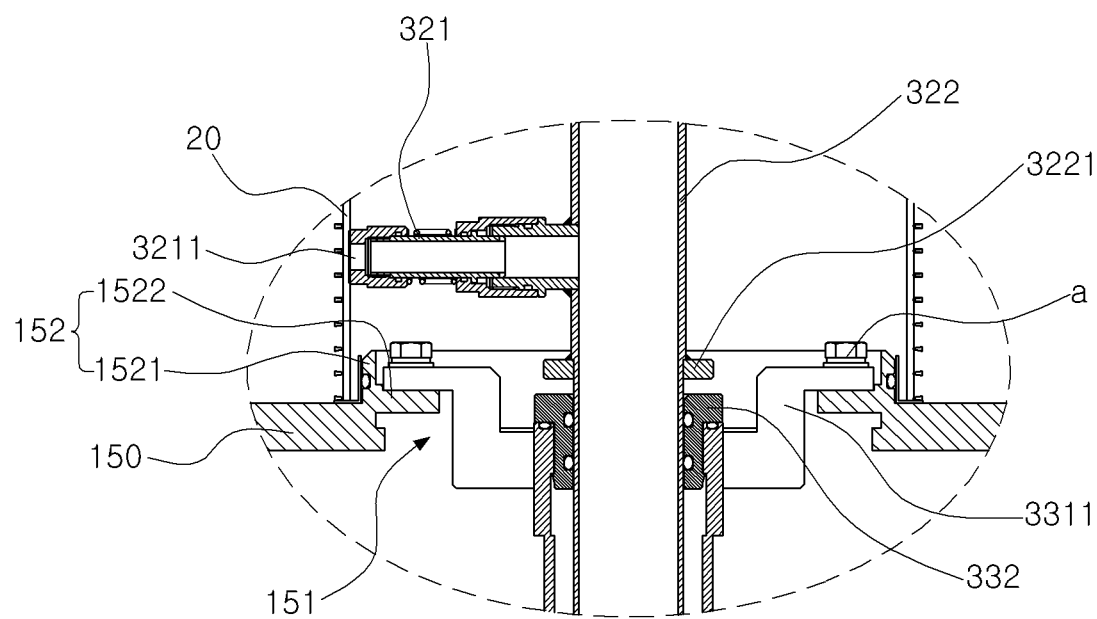

[FIG. 9]
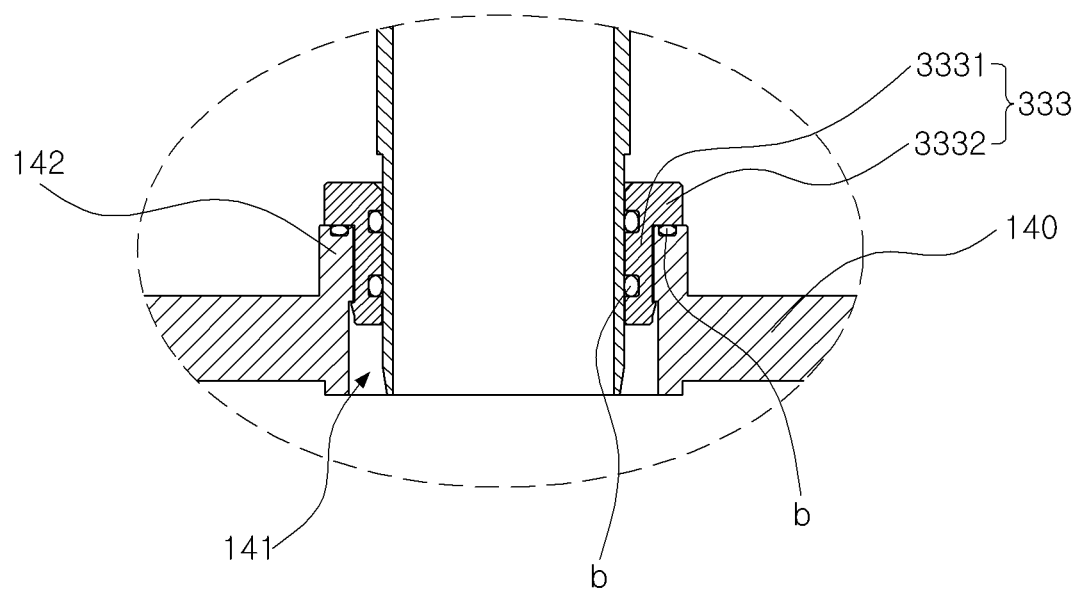

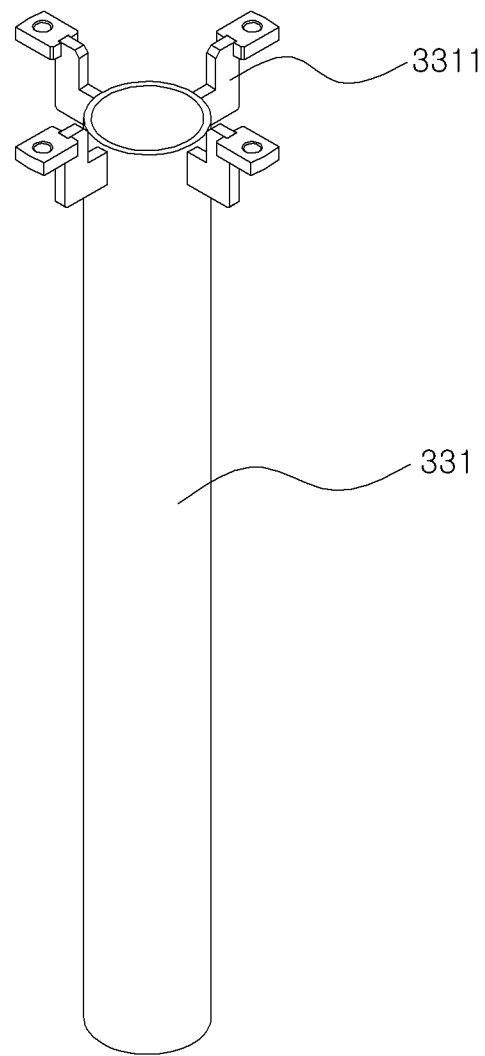
【FIG. 10】

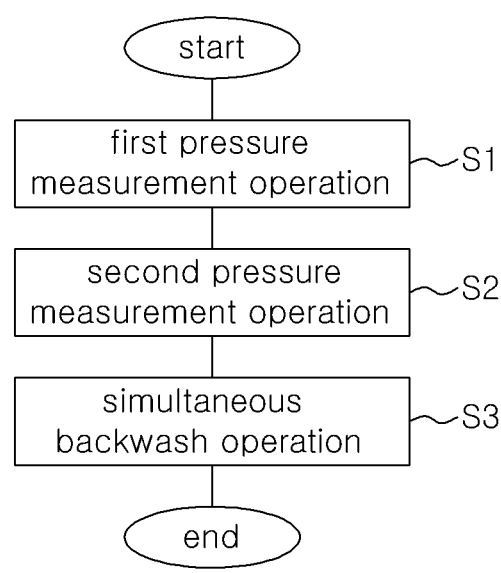
【FIG. 11】

MULTICAGE-TYPE APPARATUS FOR FILTERING BALLAST WATER FOR AUTOMATICALLY CONTROLLING SIMULTANEOUS REVERSE CLEANING AND METHOD FOR SAME

TECHNICAL FIELD

The present invention generally relates to multi-cage type ballast water filtering apparatuses including a body into or from which ballast water is drawn or discharged, and a plurality of filtering units connected to each other to form a packaged structure in the body, and methods of filtering ballast water using the filtering apparatuses. More particularly, the present invention relates to a multi-cage type ballast water filtering apparatus having a function of automatically controlling simultaneous backwashing that includes filters filtering ballast water flowing through the body, and an automatic washing unit provided for backwashing each filter to remove foreign substances from the filters. The multi-cage type ballast water filtering apparatus further includes a first pressure sensor that measures the pressure in space between the filters and the body, and second pressure sensors that are installed on some of the filtering units and measure the pressures in the respective filters of the filtering units. The filtering apparatus is configured such that when a difference between a value measured by each second pressure sensor and a value measured by the first pressure sensor exceeds a predetermined range, the automatic washing units of all of the filtering units are operated to backwash the filters and remove foreign substances from the filter, whereby the efficiency of removing foreign substances and the economic feasibility can be improved.

BACKGROUND ART

Ballast water refers to sea water that is charged into a ballast tank of a vessel to maintain balance of the vessel when the vessel sails without cargo. As marine transportation rates have gradually increased along with an increase in international trade, the number of vessels used has increased, and the vessels used are becoming larger. As a result, the amount of ballast water used in vessels has greatly increased. As the amount of ballast water used in vessels is increased, occurrence of damage to indigenous ocean ecosystems attributable to foreign marine creature species is also increased. To solve such international environmental issues, in 2004, the IMO (International Maritime Organization) established 'International convention for the control and management for vessel's ballast water and sediments'. Since 2009, ballast water treatment apparatuses have been obligatorily installed in newly constructed vessels.

As examples of conventional methods for treating ballast water, a method of exchanging ballast water when a vessel is at the sea and a method of treating ballast water when a vessel is dry docked have been used. However, these conventional methods have the disadvantage of being inefficient. Therefore, recently, a method using a ballast water treatment apparatus installed in a vessel has been widely used. Particularly, a filtration method using a filter is mainly used as the ballast water treatment apparatus. As vessels are becoming larger, there is an increasing need for the treatment of a large amount of ballast water. Accordingly, multi-cage ballast water filtering apparatuses that can treat a large amount of ballast water are recently being used.

FIG. 1 is a partially broken exploded perspective view showing a conventional multi-cage type ballast water filtering apparatus. FIG. 2 is a plan view of the conventional multi-cage type ballast water filtering apparatus. FIG. 3 is a bottom view of the conventional multi-cage type ballast water filtering apparatus.

Hereinafter, the conventional multi-cage type ballast water filtering apparatus will be explained with reference to FIGS. 1 through 3.

The conventional multi-cage type ballast water filtering apparatus includes a first pressure sensor 73 that measures the pressure in space between filters 71 and the body 72, and second pressure sensors 75 that are installed in respective filtering units (referring to units each of which includes the single filter 71 and an automatic washing unit 74) and measure the pressures in the filters 71 of the respective filtering units. Based on the theory that foreign substances adhering to the filters 71 increase the pressure in the filters 71, if there are filtering units that cause differences between the pressure in the body 72 and the pressures in the filters 71, and that pressure exceeds a predetermined range, the automatic washing units 74 of the corresponding filtering units are successively operated to backwash the related filters 71. However, if the pressure in the filter 71 of any specific filtering unit that has been backwashed is rapidly increased again, only the filter 71 of the specific filtering unit may be repeatedly backwashed without the other filters 71 being backwashed.

Furthermore, in the conventional multi-cage type ballast water filtering apparatus, discharge pipes 76 through which foreign substances and backwash water are discharged out of the body 72 are welded to the inner surface of the body 72. Therefore, to apply corrosion-proof paint to the inner surface of the body 72 and the discharge pipes 76, a worker must enter the body 72 and conduct the corrosion-proof paint applying work after the discharge pipes 76 have been installed in the body 72. Therefore, it becomes difficult to conduct the painting work for preventing corrosion of the inner surface of the body, thus making installation and maintenance of the apparatus difficult.

Moreover, in the conventional multi-cage type ballast water filtering apparatus, the discharge pipes 76 protrude out of the body 72 and communicate with a single connection pipe 77. Thus, the external elements of the filtering apparatus are complex, and the size of the filtering apparatus is increased, making the installation and maintenance of the apparatus more difficult. Particularly, under special environment conditions, that is, in a vessel, the space provided to install such a filtering apparatus is very small (generally, to ensure sufficient space for the original purposes of a vessel, vessels are designed such that spaces such as a machinery room are relatively small). Therefore, given the fact that space defined outside the filtering apparatus is also small, the conventional structure in which installation positions of many elements are focused outside the filtering apparatus makes the installation and maintenance of the filtering apparatus more difficult. In addition, each discharge pipe 76 having a small cross-sectional area is comparatively long and bent. Hence, foreign substances may be easily caught in the discharge pipe 76, whereby backpressure impeding discharge of foreign substances and backwash water is easily formed.

DISCLOSURE

Technical Problem

Accordingly, the present invention has been made keeping in mind the above problems occurring in the prior art, and an object of the present invention is to provide a multi-cage type ballast water filtering apparatus that has a function of automatically controlling simultaneous backwashing and is configured such that a plurality of filters are simultaneously backwashed, whereby filtering efficiency of the filters can be improved, and a method of automatically controlling the simultaneous backwashing.

Another object of the present invention is to provide a multi-cage type ballast water filtering apparatus having a function of automatically controlling simultaneous backwashing and a method of automatically controlling the simultaneous backwashing in which a predetermined number of filtering units are selected in a sequence starting from highest in pressure in the filter when the filtering apparatus is operated, and second pressure sensors are respectively installed on only the selected filtering units, wherein when a difference between the values measured by the first and second pressure sensors exceeds a predetermined range, all automatic washing units of the filtering units are operated to backwash the filters. Therefore, the filter backwashing efficiency can be enhanced, and the number of second pressure sensors used is reduced so that economic feasibility can be improved.

A further object of the present invention is to provide a multi-cage type ballast water filtering apparatus having a function of automatically controlling simultaneous backwashing and a method of automatically controlling the simultaneous backwashing in which even if a large amount of foreign substances and backwash water is discharged through discharge pipes when all of the automatic washing units are simultaneously operated, the foreign substances and backwash water are collected in a post-backwashing chamber having a comparatively large space before being discharged out of the filtering apparatus, whereby backpressure that impedes movement of the foreign substances and backwash water is not easily formed.

Yet another object of the present invention is to provide a multi-cage type ballast water filtering apparatus having a function of automatically controlling simultaneous backwashing and a method of automatically controlling the simultaneous backwashing, the filtering apparatus being configured such that the discharge pipes are removably coupled to the body, whereby even if corrosion-proof paint is applied to the inner surface of the body and the discharge pipes before the discharge pipes are installed in the body, the paint can be prevented from being damaged, so that painting for preventing corrosion of the inner surface of the body can be more easily conducted, thus reducing time and cost required to manufacture the filtering apparatus.

Still another object of the present invention is to provide a multi-cage type ballast water filtering apparatus having a function of automatically controlling simultaneous backwashing and a method of automatically controlling the simultaneous backwashing, the filtering apparatus being configured such that the discharge pipes communicate with the post-backwashing chamber formed in the lower end of the body so that foreign substances and backwash water that are produced during the filter backwashing process are collected in the post-backwashing chamber before being discharged to the outside through the backwash line connected to the post-backwashing chamber. Therefore, except the backwash line, all of the elements pertaining to removing foreign substances from the filters and discharging them out of the apparatus are disposed in the body, so that the external construction of the body can be simplified and reduced in size. Thus, the installation and maintenance of the filtering apparatus can be facilitated, and the space required for installation of the filtering apparatus can be reduced, whereby the efficiency in the use of space in the vessel in which the filtering apparatus is installed can be improved.

Still another object of the present invention is to provide a multi-cage type ballast water filtering apparatus having a function of automatically controlling simultaneous backwashing and a method of automatically controlling the simultaneous backwashing, the filtering apparatus being configured such that the discharge pipes are comparatively short without bending or protruding out of the body so that the discharge pipes can be effectively prevented from being clogged by foreign substances, whereby the filter backwash efficiency can be enhanced.

Technical Solution

In order to accomplish the above objects, in an aspect, the present invention provides a multi-cage type ballast water filtering apparatus having a function of automatically controlling simultaneous backwashing, the apparatus including: a body into or from which ballast water is drawn or discharged; and a plurality of filtering units connected to each other to form a packaged structure in the body. Each of the filtering units includes a filter filtering ballast water that flows through the body, and an automatic washing unit backwashing the filter to remove foreign substances adhering to the filter. The apparatus further include: a first pressure sensor measuring a pressure in space between the body and the filters; a second pressure sensor installed on each of some of the filtering units, the second pressure sensor measuring a pressure in the filter of the corresponding filtering unit; and a control unit operating the automatic washing units of all of the filtering units when a difference between a pressure value measured by the first pressure sensor and a pressure value measured by the second pressure sensor exceeds a predetermined range.

Furthermore, a predetermined number of filtering units may be selected in a sequence starting from highest in pressure in the filter of each of the filtering units when the filtering apparatus is operated, and the second pressure sensor may be installed on each of only the selected filtering units.

The second pressure sensor may be installed on each of two or three of the filtering units.

Each of the automatic washing units may include a discharge unit having a discharge pipe functioning as a discharge passage for foreign substances removed from the corresponding filter, the discharge pipe being removably installed in the body.

The body may include: a first partition plate removably coupled to lower ends of the discharge pipes; and a second partition plate provided above the first partition plate, the second partition plate being removably coupled to upper ends of the discharge pipes. The first partition plate may include discharge pipe receiving holes into which the lower ends of the respective discharge pipes are inserted. The discharge unit may further have a second connector fitted around an outer surface of the lower end of each of the discharge pipes, the second connector being inserted into the corresponding discharge pipe receiving hole so that the discharge pipe is fastened to the first partition plate, and space between the outer surface of the discharge pipe and an inner surface of the discharge pipe receiving hole is sealed.

The first partition plate may further include a protruding ring enclosing each of the discharge pipe receiving holes, the protruding ring being provided on an upper surface of the first partition plate. The second connector may include: a sealing part disposed between the outer surface of the discharge pipe and an inner surface of the discharge pipe receiving hole, the sealing part sealing a portion of the discharge pipe receiving hole other than the discharge pipe; and a support part protruding from a portion of the sealing part, the support part coming into contact with an upper surface of the protruding ring so that the second connector is supported on the protruding ring.

Furthermore, O-rings may be respectively installed between the sealing part and the discharge pipe and between the protruding ring and the support part.

The body may include: a first partition plate removably coupled to lower ends of the discharge pipes; and a second partition plate provided above the first partition plate, the second partition plate being removably coupled to upper ends of the discharge pipes. The second partition plate may have ballast water supply holes through which ballast water is drawn into the filters. Each of the discharge pipes may include a coupling protrusion provided on an upper portion of an outer surface of the discharge pipe. The upper end of the discharge pipe may be disposed in the corresponding ballast water supply hole, and the coupling protrusion may be placed on an upper surface of the second partition plate.

The coupling protrusion may be removably coupled to the second partition plate by a fastening means.

The automatic washing unit may further include a suction unit sucking the foreign substances from the filter. The suction unit may include: a suction rod sucking the foreign substances adhering to the filter; and a core to which the suction rod is connected, the core functioning as a rotating shaft for rotating the suction rod, with a stopper provided at a predetermined position on the core so that when the stopper comes into contact with the body, downward movement of the core is limited, whereby the suction rod is prevented from colliding with the body and being damaged.

Each of the automatic washing units may include a discharge unit comprising a discharge pipe functioning as a discharge passage for foreign substances removed from the corresponding filter. The body may include: a first partition plate coupled to lower ends of the discharge pipes; and a post-backwashing chamber formed between the first partition plate and a bottom surface forming a lowermost surface of the body, the post-backwashing chamber communicating with the discharge pipes so that the foreign substances removed from the filters are temporarily stored in the post-backwashing chamber, whereby each of the discharge pipes can be configured to be short without bending so that the discharge pipe can be prevented from being clogged.

The multi-cage type ballast water filtering apparatus may further include a backwash line connected to the bottom surface of the body, the backwash line communicating with the post-backwashing chamber so that the foreign substances are discharged out of the body through the backwash line, whereby efficiency in use of space in a vessel is enhanced, and a structure of the filtering apparatus is simplified.

In another aspect, the present invention provides a method of automatically controlling simultaneous backwashing during a ballast water filtering process using a multi-cage type ballast water filtering apparatus comprising a body into or from which ballast water is drawn or discharged, and a plurality of filtering units connected to each other to form a packaged structure in the body, the method including: a first pressure measurement operation of using a first pressure sensor and measuring a pressure in the body, in which filtered ballast water has been stored; a second pressure measurement operation of using second pressure sensors respectively installed on some of the filtering units and individually measuring pressures in the filters of the filtering unit provided with the second pressure sensors; and a simultaneous backwash operation comparing the pressure in the filter of each of the filtering unit measured in the second pressure measurement operation to the pressure in the body measured in the first pressure measurement operation, and operating all of the automatic washing units of the filtering units when a difference in pressure between the filter and the body exceeds a predetermined range, whereby efficiency of backwashing the filters can be enhanced.

In the method, a predetermined number of filtering units may be selected in a sequence starting from highest in pressure in the filter of each of the filtering units when the filtering apparatus is operated, and the second pressure sensor is installed on each of only the selected filtering units.

Advantageous Effects

The following effects can be obtained from the above-described embodiments and the construction, element coupling relationship and operation of the present invention which will be described later herein.

A plurality of filters is simultaneously backwashed so that the filtering efficiency thereof can be enhanced.

Furthermore, a predetermined number of filtering units are selected in a sequence starting from highest in pressure in the filter when the filtering apparatus is operated, and second pressure sensors are respectively installed on only the selected filtering units. When a difference between the values measured by the first and second pressure sensors exceeds a predetermined range, all automatic washing units of the filtering units are operated to backwash the filters. Therefore, the filter backwashing efficiency can be enhanced, and the number of second pressure sensors used is reduced so that economic feasibility can be improved.

In addition, even if a large amount of foreign substances and backwash water is discharged through discharge pipes when all of the automatic washing units are simultaneously operated, the foreign substances and backwash water are collected in a post-backwashing chamber having a comparatively large space before being discharged out of the filtering apparatus. Consequently, formation of backpressure that impedes movement of the foreign substances and backwash water can be prevented.

The discharge pipes are removably coupled to the body. Even if corrosion-proof paint is applied to the inner surface of the body and the discharge pipes before the discharge pipes are installed in the body, the paint can be prevented from being damaged. Therefore, painting for preventing corrosion of the inner surface of the body can be more easily conducted, thus reducing time and cost required to manufacture the filtering apparatus.

The discharge pipes, through which foreign substances and backwash water are discharged out of the body, communicate with the post-backwashing chamber formed in the lower end of the body. Foreign substances and backwash water that are made during the filter backwashing process are collected in the post-backwashing chamber before being discharged to the outside through the backwash line connected to the post-backwashing chamber. Therefore, except the backwash line, all of the elements pertaining to removing foreign substances from the filters and discharging them out of the apparatus are disposed in the body. Thus, the external construction of the body can be simplified and reduced in size, and thereby the installation and maintenance of the filtering apparatus can be facilitated. The space required for installation of the filtering apparatus can be reduced, whereby the efficiency in the use of space in the vessel in which the filtering apparatus is installed can be improved.

Furthermore, the discharge pipes are comparatively short without bending or protruding out of the body. Therefore, the discharge pipes can be effectively prevented from being clogged by foreign substances, whereby the filter backwash efficiency can be enhanced.

DESCRIPTION OF DRAWINGS

FIG. 1 is a partially broken exploded perspective view showing a conventional multi-cage type ballast water filtering apparatus.

FIG. 2 is a plan view of the conventional multi-cage type ballast water filtering apparatus.

FIG. 3 is a bottom view of the conventional multi-cage type ballast water filtering apparatus.

FIG. 4 is a partially broken exploded perspective view illustrating a multi-cage type ballast water filtering apparatus according to an embodiment of the present invention.

FIG. 5 is a sectional view illustrating the multi-cage type ballast water filtering apparatus according to the embodiment of the present invention.

FIG. 6 is a plan view illustrating the multi-cage type ballast water filtering apparatus according to the embodiment of the present invention.

FIG. 7 is a bottom view illustrating the multi-cage type ballast water filtering apparatus according to the embodiment of the present invention.

FIG. 8 is an enlarged view of portion A of FIG. 5.

FIG. 9 is an enlarged view of portion B of FIG. 5.

FIG. 10 is a perspective view of a discharge unit used in the multi-cage type ballast water filtering apparatus according to the embodiment of the present invention.

FIG. 11 is a flowchart showing a method of automatically controlling simultaneous backwashing using the multi-cage type ballast water filtering apparatus according to an embodiment of the present invention.

DESCRIPTION OF THE REFERENCE NUMERALS IN THE DRAWINGS

10: body 110: inlet port 120: outlet port 130: top surface
140: first partition plate 150: second partition plate 160: bottom surface 170: upper cover plate
131: filter insert hole 141: discharge pipe receiving hole
142: protruding ring 151: ballast water supply hole
152: connection protrusion 1521: filter support part 1522: coupling-protrusion support part 20: filter
30: automatic washing unit 310: drive unit 320: suction unit 330: discharge unit
311: drive motor 312: drive shaft 321: suction rod 322: core
331: discharge pipe 332: first connector 333: second connector
3211: suction hole
3221: stopper 3311: coupling protrusion 3331: sealing part 3332: support part
40: backwash line 50: first pressure sensor 60: second pressure sensor
S1: pre-filtering chamber S2: post-filtering chamber S3: post-backwashing chamber a: fastening means
b: O-ring

BEST MODE

Hereinafter, a multi-cage type ballast water filtering apparatus having a function of automatically controlling simultaneous backwashing and a method of automatically controlling simultaneous backwashing according to the present invention will be described in detail with reference to the attached drawings. Unless otherwise defined, all terms including technical and scientific terms used herein have the same meaning as commonly understood by one of ordinary skill in the art to which this invention belongs. When terms used herein discord from the commonly understood meaning, the terms will be interpreted as defined herein. In the following description of the present invention, detailed descriptions of known functions and components incorporated herein will be omitted when it may make the subject matter of the present invention unclear.

FIG. 4 is a partially broken exploded perspective view illustrating a multi-cage type ballast water filtering apparatus according to an embodiment of the present invention. FIG. 5 is a sectional view illustrating the multi-cage type ballast water filtering apparatus according to the embodiment of the present invention. FIG. 6 is a plan view illustrating the multi-cage type ballast water filtering apparatus according to the embodiment of the present invention. FIG. 7 is a bottom view illustrating the multi-cage type ballast water filtering apparatus according to the embodiment of the present invention. FIG. 8 is an enlarged view of portion A of FIG. 5. FIG. 9 is an enlarged view of portion B of FIG. 5. FIG. 10 is a perspective view of a discharge unit used in the multi-cage type ballast water filtering apparatus according to the embodiment of the present invention. FIG. 11 is a flowchart showing a method of automatically controlling simultaneous backwashing using the multi-cage type ballast water filtering apparatus according to an embodiment of the present invention.

The multi-cage type ballast water filtering apparatus according to the embodiment of the present invention will be described with reference to FIGS. 4 through 10. The ballast water filtering apparatus includes: a body 10 into or from which ballast water is drawn or discharged; a plurality of filtering units that are installed in the body 10, and each of which includes a filter 20 and an automatic washing unit 30; a backwash line 40 that is connected to the body 10, and along which foreign substances and backwash water moves; a first pressure sensor 50 that measures pressure in the body 10; a second pressure sensor 60 that measures pressure in the filter 20; and a control unit (not shown) for controlling the operation of the filtering apparatus. Although a separate reference numeral is not used to designate the filtering unit, it refers to a unit including the filter 20 and the automatic washing unit 30.

The body 10 forms an outer frame of the multi-cage type ballast water filtering apparatus according to the present invention. Drawn into the body 10 through the inlet port 110, ballast water passes through the filtering units disposed in the body 10 so that foreign substances are removed from the ballast water. Thereafter, the filtered ballast water is discharged out of the body 10 through the outlet port 120. Preferably, the outlet port 120 of the body 10 is disposed above the inlet port 110. The body 10 has a pre-filtering chamber S1, a post-filtering chamber S2, and a post-backwashing chamber S3 therein. The pre-filtering chamber S1 is formed both by a first partition plate 140 that is provided in a lower portion of the body 10 and by a second partition plate 150 that is provided above the first partition plate 140, with the inlet port 110 disposed between the first partition plate 140 and the second partition plate 150. Ballast water drawn through the inlet port 110 is temporarily stored in the pre-filtering chamber S1 before filtering. The post-filtering chamber S2 is formed by the second partition plate 150 and a top surface 130 that forms the uppermost surface of the body 10, with the outlet port 120 disposed between the second partition plate 150 and the top surface 130. The filters 20 are disposed in the post-filtering chamber S2, and ballast water that has been filtered by the filters 20 is stored in the post-filtering chamber S2. The post-backwashing chamber S3 is formed by the first partition plate 140 and a bottom surface 160 that forms the lowermost surface of the body 10. Foreign substances and backwash water that have been discharged during a backwashing process using the filters 20 are stored in the post-backwashing chamber S3.

The top surface 130 has filter insert holes 131 through which the filters 20 can be inserted into the body 10. After the filters 20 have been installed, upper cover plates 170 are coupled to the top surface 130 to cover the respective filter insert holes 131.

The first partition plate 140 has therein discharge pipe receiving holes 141 into which corresponding discharge pipes 331, which will be explained later herein, are removably inserted. Enclosing the respective discharge pipe receiving holes 141, protruding rings 142 are provided on an upper surface of the first partition plate 140 and are respectively brought into contact with second connectors 333, which will be explained later herein. Ballast water supply holes 151 are formed in the second partition plate 150 so that ballast water that has been in the pre-filtering chamber S1 can be supplied to the filters 20. Enclosing each ballast water supply hole 151, a connection protrusion 152 is provided on the first partition plate 140 to stably support a lower end of the corresponding filter 20 and is removably coupled to a corresponding coupling protrusion 3311, which will be explained later herein.

The connection protrusion 152 includes a filter support part 1521 and a coupling-protrusion support part 1522. The filter support part 1521 protrudes from an upper surface of the second partition plate 150 and encloses the corresponding ballast water supply hole 151. Furthermore, the filter support part 1521 is fitted into a lower end of the corresponding filter 20 so as to support the filter 20. The coupling-protrusion support part 1522 protrudes from an inner surface of the filter support part 1521. An upper surface of the coupling-protrusion support part 1522 comes into contact with a lower surface of the corresponding coupling protrusion 3311 and thus supports the corresponding discharge pipe 331.

Each filter 20 is configured to filter ballast water drawn into the body 10 and remove foreign substances or the like from the ballast water. The filter 20 is inserted into the body 10 through the corresponding filter insert hole 131 and disposed in the post-filtering chamber S2. The lower end of the filter 20 is fastened to the second partition plate 150, and an upper end thereof is fastened to the top surface 130. Ballast water, which has been drawn in the pre-filtering chamber S1 through the inlet port 110 and temporarily stored in the pre-filtering chamber S1, is supplied into each filter 20 through the corresponding ballast water supply hole 151 and then flows into the post-filtering chamber S2 while foreign substances or the like are caught by an inner circumferential surface of the filter 20 and thus filtered out from the ballast water. Preferably, each filter 20 has a cylindrical shape. While ballast water passes through the filter 20, foreign substances, for example, creatures, particles, etc., are filtered out from the ballast water. As such a filtering operation continues, foreign substances are deposited on the inner circumferential surface of the filter 20, thus deteriorating the filtering function. Given this, the automatic washing unit 30, which will be explained in detail later herein, conducts the operation of removing foreign substances from the inner circumferential surface of the filter 20.

The automatic washing unit 30 functions to backwash the filter 20 to remove foreign substances that have adhered to the filter 20. To achieve this purpose, the automatic washing unit 30 includes a drive unit 310 which operates the automatic washing unit 30 in response to a signal of a control unit (not shown), a suction unit 320 which is connected to and moved by the drive unit 310 and sucks foreign substances from the filter 20, and a discharge unit 330 which discharges the foreign substances, sucked by the suction unit 320.

The drive unit 310 provides power to operate the automatic washing unit 30 and uses the power to rotate the suction unit 320 and/or move it in the vertical direction. The drive unit 310 includes a drive motor 311 that provides drive force, and a drive shaft 312 that is connected at a first end thereof to the drive motor 311 and is rotated and/or vertically moved by drive force transmitted from the drive motor 311 so that a core 322 of the suction unit 320, which is connected to a second end of the drive shaft 312 and will be explained in detail later herein, is rotated and/or moved in the vertical direction by the operation of the drive shaft 312.

Connected to the drive unit 310, the suction unit 320 moves and sucks foreign substances adhering to the filter 20. The suction unit 320 includes a plurality of suction rods 321 which suck foreign substances adhering to the filter 20, and the core 322 to which the suction rods 321 are connected at positions spaced apart from each other at regular intervals in the longitudinal direction of the core 322. The core 322 is coupled at an end thereof to the drive shaft 312 of the drive unit 310 and is rotated and/or vertically moved in conjunction with the rotation and/or vertical movement of the drive shaft 312, thus acting as a rotating shaft to rotate the suction rods 321.

An end of each suction rod 321 comes into contact with the inner circumferential surface of the filter 20 or is positioned close to it. A suction hole 3211 is formed in the suction rod 321 along the longitudinal axis thereof, so that the suction rod 321 sucks, through the suction hole 3211, foreign substances adhering to the inner circumferential surface of the filter 20 and backwash water (filtered ballast water that is outside the filter 20 is drawn backwards into the filter 20 again by suction pressure in the suction hole 3211 and is sucked, along with foreign substances adhering to the inner surface of the filter 20, into the suction hole 3211, wherein this ballast water is referred to as 'backwash water'). The foreign substances and backwash water that are sucked into the suction rod 321 are moved into the core 322. Foreign substances and backwash water that are drawn from the suction rods 321 into the core 322 are moved to the discharge unit 330 through a pipe passage which is longitudinally formed in the core 322, and then discharged out of the apparatus.

A first end of the core 322 is connected to the drive shaft 312, and a second end thereof communicates with the corresponding discharge pipe 331, which will be explained later herein. Foreign substances and backwash water that are drawn from the suction rods 321 are discharged through the corresponding discharge pipes 331. As shown in FIG. 8, a stopper 3221 is provided on a predetermined portion of the core 322, in detail, at a position lower than the lowermost suction rod 321 attached to the core 322. When the stopper 3221 comes into contact with a first connector 332, which will be explained later herein, the downward movement of the core 322 is limited.

The discharge unit 330 functions to transfer foreign substances, etc., sucked by the suction unit 320. The discharge unit 330 includes the discharge pipe 331, the first connector, and the second connector 333.

An upper end of the discharge pipe 331 communicates with the corresponding core 322, and a lower end thereof communicates with the post-backwashing chamber S3 so that the discharge pipe 331 transfers foreign substances, etc. from the core 322 to the post-backwashing chamber S3. The discharge pipe 331 is removably installed in the body 10. The upper end of the discharge pipe 331 is inserted into the corresponding ballast water supply hole 151 and removably connected to the second partition plate 150. The lower end of the discharge pipe 331 is inserted into the corresponding discharge pipe receiving hole 141 and removably connected to the first partition plate 140. The discharge pipe 331 is provided with coupling protrusions 3311 that radially protrude outward from an outer surface of the discharge pipe 331. When the discharge pipe 331 is connected to the second partition plate 150, the lower surfaces of the coupling protrusions 3311 make contact with the upper surface of the coupling-protrusion support part 1522. In this embodiment, as shown in FIG. 8, after the coupling protrusions 3311 of the discharge pipe 331 are placed on the coupling-protrusion support part 1522 of the second partition plate 150, the coupling protrusions 3311 are coupled to the coupling-protrusion support part 1522 by a fastening means a such as bolts. In this way, the discharge pipe 331 can be removably connected to the second partition plate 150.

The first connector 332 is disposed between an inner surface of the discharge pipe 331 and the outer surface of the core 322 so as to prevent pre-filtered ballast water from entering space between the discharge pipe 331 and the core 322. Furthermore, when the first connector 332 makes contact with the stopper 3221 during the movement of the core 322, the downward movement of the core 322 is limited. The first connector 332 is made of nonmetallic material, particularly, plastic such as self-lubricative material, polypropylene (PP), nylon, etc. so that the stopper 3221 or the first connector 322 can be prevented from being damaged despite frequent contact or collision.

The second connector 333 is fitted over the outer surface of the lower end of the discharge pipe 331 to have a shape enclosing the discharge pipe 331 and is fitted into the discharge pipe receiving hole 141. Thus, the discharge pipe 331 is fastened to the first partition plate 140. Furthermore, space between the outer surface of the discharge pipe 331 and the inner surface of the pipe receiving hole 141 is reliably sealed, whereby ballast water that has been stored in the pre-filtering chamber S1 is prevented from entering the post-backwashing chamber S3. The second connector 333 is made of a predetermined material, preferably an elastic material.

The second connector 333 includes a sealing part 3331 and a support part 3332. The sealing part 3331 is disposed between the outer surface of the lower end of the discharge pipe 331 and a side surface of the protruding ring 142 so as to seal the discharge pipe receiving hole 141. The support part 3332 protrudes from a surface of the sealing part 3331 and comes into contact with an upper surface of the protruding ring 142 so that the second connector 333 is supported on the protruding ring 142. An O-ring b is provided on a side surface of the sealing part 3331 so as to watertightly seal space between the sealing part 3331 and the discharge pipe 331. An O-ring b is provided on the lower surface of the support part 3332 so as to watertightly seal space between the support part 3322 and the protruding ring 142.

As stated above, after the coupling protrusions 3311 are placed on the coupling-protrusion support part 1522 of the second partition plate 150, the upper end of the discharge pipe 331 can be removably coupled to the second partition plate 150 by the fastening means a. Furthermore, the lower end of the discharge pipe 331 can be removably and watertightly coupled to the first partition plate 140 by the second connector 333. Therefore, a process of installing the discharge pipe 331 in the body 10, replacing it with another, or removing it from the body 10 can be facilitated. Moreover, unlike the conventional technique, welding is not required to couple the discharge pipe 331 to the body 10. Therefore, even if corrosion-proof paint is applied to the inner surface of the body 10 and the discharge pipe 331 before the discharge pipe 331 is installed in the body 10, the paint can be prevented from being damaged. Consequently, painting for preventing corrosion of the inner surface of the body 10 can be more easily conducted, thus reducing time and cost required to manufacture the filtering apparatus.

Communicating with the post-backwashing chamber S3, the backwash line 40 is connected to the bottom surface of the body 10 and configured to discharge foreign substances and backwash water from the post-backwashing chamber S3 to the outside. An exhaust valve (not shown) is connected to a predetermined portion of the backwash line 40. The exhaust valve is used to control supply of suction force for sucking/discharging foreign substances adhering to the inner surface of the filter 20 and is controlled by the control unit. That is, when the exhaust valve opens, pressure inside the backwash line 40, the post-backwashing chamber S3, the discharge pipe 331, the core 322, and the suction rods 321 becomes lower than atmospheric pressure, in other words, pressure in the post-filtering chamber S2 or the filter 20. Thus, ballast water that has been in the post-filtering chamber S2 is sucked into the suction rods 321 that are under low pressure, whereby foreign substances, etc. that have adhered to the inner surface of the filter 20 are sucked along with the ballast water into the suction rods 321 (here, the ballast water of the post-filtering chamber S2 that is sucked into the suction rods 321 functions as backwash water). When the exhaust valve is closed, the suction of backwash water, foreign substances, etc. is interrupted.

In the ballast water filtering apparatus having the above-mentioned construction, the discharge pipes 331 through which foreign substances and backwash water are discharged communicate with the post-backwashing chamber S3 formed in the lower portion of the body 10. Thus, foreign substances and backwash water that are produced during the filter backwashing process are collected in the post-backwashing chamber S3 in the body 10 before being discharged to the outside through the backwash line 40 connected to the post-backwashing chamber S3. Except the backwash line, all of the elements pertaining to removing foreign substances from the filters and discharging them out of the apparatus are disposed in the body 10, so that the external construction of the body 10 can be simplified and reduced in size. Therefore, the installation and maintenance of the filtering apparatus can be facilitated, and the space required for installation of the filtering apparatus can be reduced. The efficiency in the use of space in the vessel in which the filtering apparatus is installed can be improved. Furthermore, in the filtering apparatus according to the present invention, each discharge pipe 331 is comparatively short without bending or protruding out of the body 10. Thus, the discharge pipe 331 can be effectively prevented from being clogged by foreign substances, whereby the filter backwash efficiency can be enhanced.

The first pressure sensor 50 measures the pressure in space between the filters 20 and the body 10. The second pressure sensor 60 measures the pressure in the corresponding filter 20. Values measured by the first and second pressure sensors 50 and 60 are transmitted to the control unit. A transmitter for pressure measurement, a pressure sensor or a pressure difference switch is used as each of the first second pressure sensors 50 and 60. Unlike the conventional filtering apparatus explained with reference to FIGS. 1 through 3, the second pressure sensor 60 is installed on each of some predetermined filtering units (the number of second pressure sensors 60 is less than that of filtering units), as shown in FIG. 6, so that the pressure in each filter 20 of some of the filtering units is measured. As such, only some of the filtering units are provided with the second pressure sensor 60. In this embodiment, a predetermined number of filtering units are selected in a sequence starting from highest in filter pressure when the filtering apparatus is operated. The second pressure sensors are respectively installed on only the selected filtering units. Preferably, the second pressure sensors are respectively installed on only two or three filtering units. For instance, as shown in FIG. 6, after the filtering apparatus with eleven filtering units has been used to filter ballast water for a predetermined duration, the pressure in the filter 20 of each filtering unit is measured, and three filtering units are selected in a sequence starting from highest in pressure. Thereafter, when filtering apparatuses like that of FIG. 6 are manufactured, the second pressures sensors 60 are installed on only filtering units that are disposed at the same positions as those of the filtering units selected during the above filtering-unit selection process.

The control unit (not shown) controls electrical and mechanical operation of the filtering apparatus. Particularly, the control unit compares values output from the first and second pressure sensors 50 and 60 to each other and then operates all of the automatic washing units 30 of the filtering units to backwash the filters 20 when a difference between the values measured by the first and second pressure sensors 50 and 60 exceeds a predetermined range.

Hereinafter, a method of automatically controlling simultaneous backwashing in the ballast water filtering apparatus having the first and second pressure sensors 50 and according to the present invention will be described in detail with reference to FIGS. 4 through 6 and 11. During a process of filtering ballast water using the filtering apparatus in which the filtering units are connected to each other to form a packaged structure in the body 10 having the ballast water inlet and outlet ports 110 and 120, the method of automatically controlling simultaneous backwashing includes a first pressure measurement operation S1, a second pressure measurement operation S2, and a simultaneous backwash operation S3 that are successively conducted. In the first pressure measurement operation S1, the first pressure sensor 50 measures the pressure in the body 10, in which filtered ballast water has been stored, in detail, the pressure in the post-filtering chamber S2. In the second pressure measurement operation S2, the second pressure sensors 60 that are installed on only a predetermined number of filtering units selected in a sequence starting from highest in pressure in the filter are used, and the pressure in the filter 20 of each of the filtering units in which the second pressure sensors 60 are installed is individually measured. In the simultaneous backwash operation S3, values output from the first and second pressure sensors 50 and 60 are compared to each other under control of the control unit (not shown). Thereafter, when a difference between the values measured by the first and second pressure sensors 50 and 60 exceeds a predetermined range, all of the automatic washing units 30 of the filtering units are simultaneously operated.

In the first pressure measurement operation S1, as shown in FIG. 6, the pressure in the body 10 (in more detail, the post-filtering chamber S2), in which filtered ballast water has been stored, is measured by the first pressure sensor 50 that is installed on the upper end of the body 10 (as needed, the first pressure sensor 50 may be installed on the opening of the outlet port 120 of the body 10). The measured value is transmitted to the control unit (not shown) to enable the control unit (not shown) to always monitor the pressure in the body 10.

In the second pressure measurement operation S2, as shown in FIG. 6, a predetermined number of second pressure sensors 60 (less than the number of filtering units) that are provided to measure the internal pressures of the corresponding filters 20 are used. That is, the pressures in the filters 20 of the corresponding filtering units, in which the second pressure sensors 60 are installed, are measured and the measured values are transmitted to the control unit (not shown) to enable the control unit (not shown) to frequently monitor the internal pressures of the filters 20.

In the simultaneous backwash operation S3, the control unit compares the internal pressure value of the body 10 transmitted in the first pressure measurement operation S1 with the internal pressure value of the filter 20 of each filtering unit transmitted in the second pressure measurement operation S2. When a difference between the internal pressure values of the body 10 and the filter 20 exceeds a predetermined range, all of the automatic washing units 30 for the filtering units are simultaneously operated to conduct the backwashing operation of removing foreign substances from the filters 20. Therefore, the present invention can solve the problem of the conventional filtering apparatus that malfunctions in such a way that the filters 20 of only the specific filtering units are repeatedly washed. Thereby, the filter backwashing efficiency can be enhanced. Furthermore, compared to the conventional technique, the number of second pressure sensors 60 used is reduced, whereby the cost competitiveness can be improved. Moreover, in the filtering apparatus according to the present invention, even when all of the automatic washing units 30 are simultaneously operated and a large amount of foreign substances and backwash water are discharged through the discharge pipes 331, backpressure impeding the movement of the foreign substances and backwash water can be prevented because the foreign substances and backwash water are collected in the post-backwashing chamber S3 having a comparatively large space before being discharged out of the filtering apparatus.

Although the embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A multi-cage type ballast water filtering apparatus having a function of automatically controlling simultaneous backwashing, the apparatus comprising:
   a body into or from which ballast water is drawn or discharged; and a plurality of filtering units connected to each other to form a packaged structure in the body, wherein each of the filtering units comprises a filter filtering ballast water that flows through the body, and an automatic washing unit backwashing the filter to remove foreign substances adhering to the filter, the apparatus further comprising:

a first pressure sensor measuring a pressure in space between the body and the filters;

a plurality of second pressure sensors, each one of the plurality of second pressure sensors being installed on a corresponding one of the filtering units so that some of the filtering units have one of the second pressure sensors installed thereon and others of the filtering units do not have one of the second pressure sensors installed thereon, each second pressure sensor measuring a pressure in the filter of the corresponding filtering unit; and a control unit simultaneously operating the automatic washing units of all of the filtering units when a difference between a pressure value measured by the first pressure sensor and a pressure value measured by each of the plurality of second pressure sensors exceeds a predetermined range.

2. The multi-cage type ballast water filtering apparatus of claim 1, wherein the second pressure sensor is installed on each of two or three of the filtering units.

3. The multi-cage type ballast water filtering apparatus of claim 1, wherein each of the automatic washing units comprises:

a discharge unit comprising a discharge pipe functioning as a discharge passage for foreign substances removed from the corresponding filter, the discharge pipe being removably installed in the body.

4. The multi-cage type ballast water filtering apparatus of claim 3, wherein the body comprises:

a first partition plate removably coupled to lower ends of the discharge pipes; and a second partition plate provided above the first partition plate, the second partition plate being removably coupled to upper ends of the discharge pipes, wherein the first partition plate comprises discharge pipe receiving holes into which the lower ends of the respective discharge pipes are inserted, and the discharge unit further comprises a second connector fitted around an outer surface of the lower end of each of the discharge pipes, the second connector being inserted into the corresponding discharge pipe receiving hole so that the discharge pipe is fastened to the first partition plate, and space between the outer surface of the discharge pipe and an inner surface of the discharge pipe receiving hole is sealed.

5. The multi-cage type ballast water filtering apparatus of claim 4, wherein the first partition plate further comprises a protruding ring enclosing each of the discharge pipe receiving holes, the protruding ring being provided on an upper surface of the first partition plate, and the second connector comprises: a sealing part disposed between the outer surface of the discharge pipe and an inner surface of the discharge pipe receiving hole, the sealing part sealing a portion of the discharge pipe receiving hole other than the discharge pipe; and a support part protruding from a portion of the sealing part, the support part coming into contact with an upper surface of the protruding ring so that the second connector is supported on the protruding ring.

6. The multi-cage type ballast water filtering apparatus of claim 5, wherein O-rings are respectively installed between the sealing part and the discharge pipe and between the protruding ring and the support part.

7. The multi-cage type ballast water filtering apparatus of claim 3, wherein the body comprises:

a first partition plate removably coupled to lower ends of the discharge pipes; and a second partition plate provided above the first partition plate, the second partition plate being removably coupled to upper ends of the discharge pipes, wherein the second partition plate comprises ballast water supply holes through which ballast water is drawn into the filters, each of the discharge pipes comprises a coupling protrusion provided on an upper portion of an outer surface of the discharge pipe, wherein the upper end of the discharge pipe is disposed in the corresponding ballast water supply hole, and the coupling protrusion is placed on an upper surface of the second partition plate.

8. The multi-cage type ballast water filtering apparatus of claim 7, wherein the coupling protrusion is removably coupled to the second partition plate by a fastening means.

9. The multi-cage type ballast water filtering apparatus of claim 3, wherein the automatic washing unit further comprises:

a suction unit sucking the foreign substances from the filter, the suction unit comprising:

a suction rod sucking the foreign substances adhering to the filter; and a core to which the suction rod is connected, the core functioning as a rotating shaft for rotating the suction rod, with a stopper provided at a predetermined position on the core so that when the stopper comes into contact with the body, downward movement of the core is limited, whereby the suction rod is prevented from colliding with the body and being damaged.

10. The multi-cage type ballast water filtering apparatus of claim 1, wherein each of the automatic washing units comprises:

a discharge unit comprising a discharge pipe functioning as a discharge passage for foreign substances removed from the corresponding filter, wherein the body comprises:

a first partition plate coupled to lower ends of the discharge pipes; and a post-backwashing chamber formed between the first partition plate and a bottom surface forming a lowermost surface of the body, the post-backwashing chamber communicating with the discharge pipes so that the foreign substances removed from the filters are temporarily stored in the post-backwashing chamber, whereby each of the discharge pipes can be configured to be short without bending so that the discharge pipe can be prevented from being clogged.

11. The multi-cage type ballast water filtering apparatus of claim 10, further comprising a backwash line connected to the bottom surface of the body, the backwash line communicating with the post-backwashing chamber so that the foreign substances are discharged out of the body through the backwash line, whereby efficiency in use of space in a vessel is enhanced, and a structure of the filtering apparatus is simplified.

12. A method of automatically controlling simultaneous backwashing during a ballast water filtering process using a multi-cage type ballast water filtering apparatus comprising a body into or from which ballast water is drawn or discharged, and a plurality of filtering units connected to each other to form a packaged structure in the body, the method comprising:
- a first pressure measurement operation of using a first pressure sensor and measuring a pressure in the body, in which filtered ballast water has been stored;
- a second pressure measurement operation of using second pressure sensors respectively installed on some of the filtering units but not all of the filtering units to individually measure a pressure in the filter of the filtering units provided with the second pressure sensors; and
- a simultaneous backwash operation comparing the pressure in the filter of each of the filtering units measured in the second pressure measurement operation to the pressure in the body measured in the first pressure measurement operation, and
- simultaneously operating all of the automatic washing units of the filtering units when a difference in pressure between the pressure in the filter of each of the filtering units and the pressure in the body exceeds a predetermined range, and
- wherein a predetermined number of filtering units are selected in a sequence starting from highest in pressure in the filter of each of the filtering units when a pressure in the filter of each filtering unit is measured after the filtering apparatus has been used to filter a ballast water for a determined duration, and the second pressure sensor is installed on each of only the selected filtering units.

13. A multi-cage type ballast water filtering apparatus having a function of automatically controlling simultaneous backwashing, the apparatus comprising:
- a body having a compartment configured to receive ballast water, the body having an inlet port and an outlet port;
- a plurality of filtering units coupled to the body, each of the plurality of filtering units comprising:
  - a filter disposed within the compartment of the body, each filter being configured to filter ballast water that passes through the compartment of the body;
  - an automatic washing unit coupled to each filter, each automatic washing unit being configured to backwash the filter to which the automatic washing unit is coupled to remove foreign substances adhering to the filter;
- a first pressure sensor for measuring a pressure in a space between the body and the filters;
- a plurality of second pressure sensors, each one of the plurality of second pressure sensors being installed on a corresponding one of the filtering units so that some of the filtering units have one of the second pressure sensors installed thereon and others of the filtering units do not have one of the second pressure sensors installed thereon, each second pressure sensor measuring a pressure within the filter of the corresponding filtering unit; and
- a control unit programmed to simultaneously operating the automatic washing units of all of the filtering units when a difference between the pressure value measured by the first pressure sensor and the pressure value measured by each of the plurality of second pressure sensors exceeds a predetermined range.

* * * * *